US009237830B2

(12) United States Patent
Kim

(10) Patent No.: US 9,237,830 B2
(45) Date of Patent: Jan. 19, 2016

(54) PUMP SAFETY DEVICE FOR VARIOUS CONTAINERS

(71) Applicants: Yong Jun Kim, Seoul (KR); Young Ho Kim, Seoul (KR); Boo Mi Kim Kim, Seoul (KR)

(72) Inventor: Yong Jun Kim, Seoul (KR)

(73) Assignees: Yong Jun Kim, Seoul (KR); Young Ho Kim, Seoul (KR); Bo Mi Kim, Seoul (KR)

( * ) Notice: Subject to any disclaimer, the term of this patent is extended or adjusted under 35 U.S.C. 154(b) by 0 days.

(21) Appl. No.: 14/114,870

(22) PCT Filed: Nov. 13, 2012

(86) PCT No.: PCT/KR2012/009548
§ 371 (c)(1),
(2) Date: Oct. 30, 2013

(87) PCT Pub. No.: WO2013/147386
PCT Pub. Date: Oct. 3, 2013

(65) Prior Publication Data

US 2014/0076935 A1 Mar. 20, 2014

(30) Foreign Application Priority Data

Mar. 27, 2012 (KR) ........................ 10-2012-0030935

(51) Int. Cl.
*B65D 88/54* (2006.01)
*G01F 11/00* (2006.01)
(Continued)

(52) U.S. Cl.
CPC .............. *A47K 5/1205* (2013.01); *A45D 34/04* (2013.01); *B05B 11/3008* (2013.01); *B05B 11/3043* (2013.01); *B05B 11/3059* (2013.01); *B05B 11/3073* (2013.01); *A45D 2200/056* (2013.01);
(Continued)

(58) Field of Classification Search
CPC ................ A47K 5/1205; A45D 34/04; A45D 2200/056; B05B 11/3023; B05B 11/3043; B05B 11/3073
USPC ........... 222/282, 309, 14, 72, 153.13, 153.14, 222/163, 153.01, 285, 286
See application file for complete search history.

(56) References Cited

U.S. PATENT DOCUMENTS 5,016,780 A * 5/1991 Moretti .................... 222/153.13
5,411,181 A * 5/1995 Knickerbocker ............. 222/309
(Continued)

FOREIGN PATENT DOCUMENTS

JP 2002-224601 A 8/2002
KR 20-2010-0004251 U 4/2010
(Continued)

*Primary Examiner* — J. Casimer Jacyna
*Assistant Examiner* — Benjamin R Shaw
(74) *Attorney, Agent, or Firm* — Birch, Stewart, Kolasch & Birch, LLP

(57) ABSTRACT

Disclosed is a pump safety device for various containers which makes it possible to freely adjust a discharge amount of contents from a container and to securely fix a pump in such as way to install an adjusting member and a safety pin at a pump for various containers which are used to contain cosmetics, shampoo and kitchen rinses. The pump safety device for various containers comprises a female screw part which is provided at an inner side of the cap; and an adjusting member which is engaged to the female screw part of the cap and is installed at the top of the cap and is capable of adjusting upward or downward.

5 Claims, 5 Drawing Sheets

(51) Int. Cl.
*A47K 5/12* (2006.01)
*A45D 34/04* (2006.01)
*B05B 11/00* (2006.01)

(52) U.S. Cl.
CPC ......... *B05B 11/3023* (2013.01); *B05B 11/3047* (2013.01)

(56) References Cited

U.S. PATENT DOCUMENTS

| | | | | | |
|---|---|---|---|---|---|
| 5,423,752 | A * | 6/1995 | Haber et al. | 604/86 |
| 5,535,952 | A * | 7/1996 | Tada | 239/333 |
| 5,662,246 | A * | 9/1997 | Contaxis, III | 222/153.07 |
| 6,186,366 | B1 * | 2/2001 | Good et al. | 222/153.14 |
| 6,364,167 | B1 * | 4/2002 | Safian et al. | 222/153.13 |
| 6,405,903 | B2 * | 6/2002 | Stadelhofer | 222/309 |
| 6,443,331 | B1 * | 9/2002 | DeJonge | 222/153.13 |
| 2005/0072808 | A1 * | 4/2005 | Kitamura | 222/309 |
| 2010/0051649 | A1 | 3/2010 | Ki | |

FOREIGN PATENT DOCUMENTS

| | | | |
|---|---|---|---|
| KR | 20-2010-0004550 | U | 5/2010 |
| KR | 10-1021611 | A | 3/2011 |
| KR | 20-0458220 | Y1 | 1/2012 |
| KR | 10-2012-0010451 | A | 2/2012 |

* cited by examiner

PUMP SAFETY DEVICE FOR VARIOUS CONTAINERS

TECHNICAL FIELD

The present invention relates to a pump safety device for various containers, and in particular to a pump safety device for various containers which makes it possible to freely adjust a discharge amount of contents from a container and to securely fix a pump in such as way to install an adjusting member and a safety pin at a pump for various containers which are used to contain cosmetics, shampoo and kitchen rinses.

BACKGROUND ART

The substances such as cosmetics, shampoo and kitchen rinses directly contacting with a human skin may be easily spoiled with impurities such as contaminated water. In order to improve the above problems, a pump equipped with a pumping part is developed, which has features in that a certain amount of contents what a user wants can be discharged, and an external air or impurities are prevented from entering.

The container equipped with a pump is widely used. As shown in FIG. 1, at the top of a container with contents is engaged a pump which is a pumping part 20 configured to such contents.

The pumping part 20 comprises at the top a press button 21 and a discharge tube 22 integrally projecting from one side of the press button 21 for discharging outside the contents, a support tubular member 25 engaged to the bottom of the press button 21, a piston 27 installed at the bottom of the support tubular member 25, a spring 27 engaged to the bottom of the piston 27, a cylinder part 26 disposed at the bottom of the support tubular member 25 and containing a piston 27 and a spring 28, and a cap 23 and a lid 24 which are provided at the top of the cylinder part 26. The lid 24 with the cap 23 is engaged to the top of the container 10 containing contents.

When the user presses the press button 21, the pressing force is supplied to the cylinder part 26 of the pumping part which is engaged to the support tubular member 25 of the press button 21. The piston 27 provided inside is pushed down, and the internal pressure increases, and the contents in the interior of the cylinder part 26 is discharged outside through a discharge tube 22 of the press button 21.

When the pressing force is removed from the press button 21, the piston 27 returns back by an elastic force of the spring 28 provided in the interior of the cylinder part 26, and the pressure of the interior of the cylinder part 26 descends, and the contents contained in the interior of the container 10 are filled into the interior of the cylinder part 26 along the tube 29 by means of the pressure.

The above mentioned pumping means 20 is capable of better adjusting a discharge amount as compared to the container just equipped with a conventional lid, and the contents may be less contaminated by impurities.

The conventional pumping means 20 has problems in that it is impossible to presume an accurate amount of content discharges because the press button 21 is pressed by a user in such a way that the user rotates the press button 21, and the press button 21 is discharged from the cap 23 and moves upward in a state that a male screw part 21*c* formed at the bottom of the press button 21 is engaged to the cap 23. After use, when the user pushes the press button 21 to rotate, so the male screw part 21*c* formed at a connection portion 21*a* at the bottom of the press button 21 is engaged to the cap 23; however in this case the contents of the container may be wasted when the press button is locked after use. When the press button is not locked so as to prevent the waste, a kid or children may randomly press the press button 21 and may eat the discharged contents.

There are methods of covering a safety lid onto the pumping means 20 of the container 10 and of inserting or separating a fixing pin into/from between the press button 21 and the cap 23.

In the above methods, the procedures of inserting or separating a safety lid or a fixing pin may cause them to be lost.

The inventor of the present invention has developed a pump safety device for various containers which has features in that the press button is securely fixed and not pressed because it is locked by an adjusting member without the press button being pressed, in such a way to install an adjusting member and a safety pin at a pump which is a pumping means for various containers. When in use, the adjusting member is rotated and ascends and descends, and the pressing degree of the press button can be adjusted, which helps freely adjust the discharge amount of the contents from the container. The present invention can provide a stable locking and a safety with respect to the reaches of kids or children.

Disclosure of Invention

Accordingly, it is an object of the present invention to provide a pump safety device for various containers which makes it possible to freely adjust a discharge amount of contents from a container and to securely fix a pump in such as way to install an adjusting member and a safety pin at a pump for various containers which are used to contain cosmetics, shampoo and kitchen rinses.

It is another object of the present invention to provide a pump safety device for various containers which makes it possible to keep a safe use of products by preventing kids or children from carelessly using the products in such a way to install an adjusting member and a safety pin at a pump for various containers and to securely fix the press button by which the press button is not randomly pressed.

It is further another object of the present invention to provide a safety device for various containers which makes it possible to conveniently use the products so that a user can freely adjust the discharge amount of contents in the pump for various containers.

It is still further another object of the present invention to provide a safety device for various containers which has features in that a press button is not pressed when not in use by installing an adjusting member and a safety pin for various containers so as to protect kids and children and when in use, the pressing degree of the press button can be adjusted by rotating the adjusting member and moving upward and downward the same, which makes it possible to freely adjust the discharge amount of contents from the container, for thereby providing the most safe locking and safety operations.

To achieve the above objects, there is provided a pump safety device for various containers, comprising a pumping means which is engaged to the top of a container containing contents and sucks contents, the pumping means being provided in various types and being formed of a press button and a discharge tube which integrally projects from one side of the press button and discharge contents to the outside, which are provided at the top, a cylinder part installed at an outer side of a support tubular member engaged to the bottom of the press button, and a cap and a lid which are installed at the top of the cylinder part, the lid being engaged to the top of the container containing contents; a female screw part which is provided at an inner side of the cap; and an adjusting member which is engaged to the female screw part of the cap and is installed at the top of the cap and is capable of adjusting upward or downward.

The adjusting member comprises a male screw part which is formed at an outer side of the bottom for an engagement with the female screw part of the cap; and a tooth-shaped adjusting part which is formed at the top and is manually rotatable.

When in not use, the adjusting member is disengaged from the cap and is moved upward for the press button not to be pressed, and when in use, the adjusting member is freely tightened and is moved downward for the press button to be pressed, for thereby adjusting a discharge amount of the contents from the container.

A safety pin groove is formed at a connection portion of the bottom of the press button, and a pin groove is formed at the top of the adjusting part matching with the safety pin groove, and a safety pin is hinge-engaged to both sides of the pin groove and has a handle at the top for an insertion into the safety pin groove.

Advantageous Effects

The pump safety device for various containers according to the present invention makes it possible to freely adjust a discharge amount of contents from a container and to securely fix a pump in such as way to install an adjusting member and a safety pin at a pump for various containers which are used to contain cosmetics, shampoo and kitchen rinses.

In addition, the pump safety device for various containers according to the present invention makes it possible to keep a safe use of products by preventing kids or children from carelessly using the products in such a way to install an adjusting member and a safety pin at a pump for various containers and to securely fix the press button by which the press button is not randomly pressed.

In addition, the safety device for various containers according to the present invention makes it possible to conveniently use the products so that a user can freely adjust the discharge amount of contents in the pump for various containers.

In addition, the safety device for various containers according to the present invention has features in that a press button is not pressed when not in use by installing an adjusting member and a safety pin for various containers so as to protect kids and children and when in use, the pressing degree of the press button can be adjusted by rotating the adjusting member and moving upward and downward the same, which makes it possible to freely adjust the discharge amount of contents from the container, for thereby providing the most safe locking and safety operations.

BEST MODE FOR CARRYING OUT THE INVENTION

The preferred embodiments of the present invention will be described in details with reference to the accompanying drawings. It is noted that the present invention may be embodied in various fashions which are not limited by the disclosures.

Figure 1:
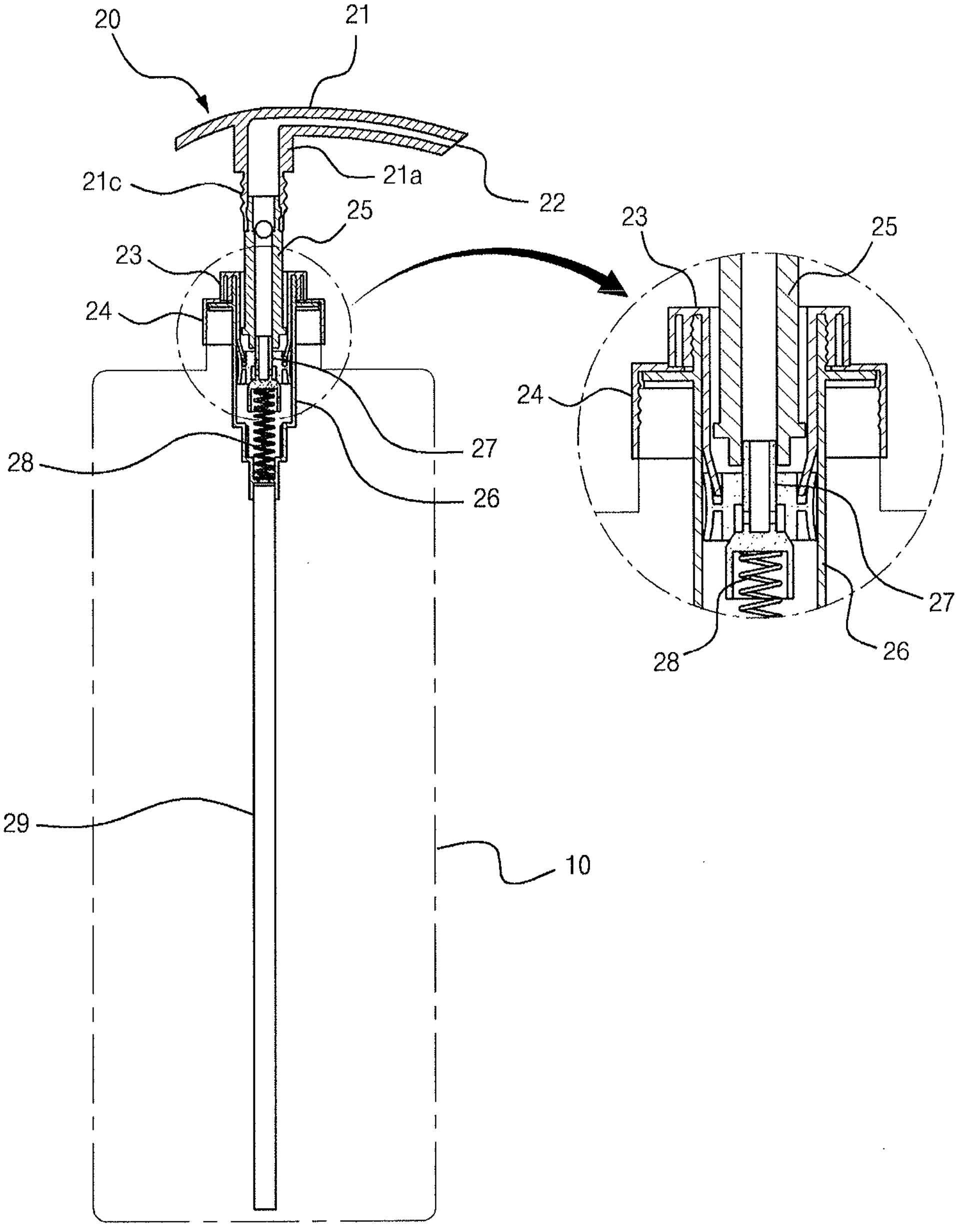
FIG. 1 is a view illustrating a conventional pumping means for various containers.
Figure 2:
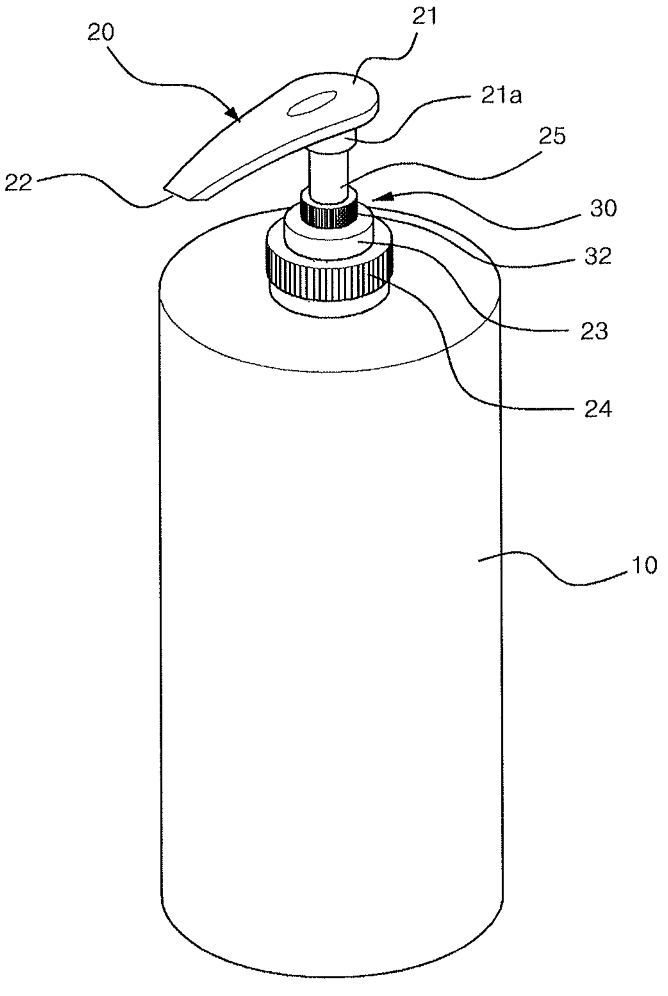
FIG. 2 is a perspective view illustrating a construction that a pumping part is installed at various containers according to the present invention.
Figure 3:
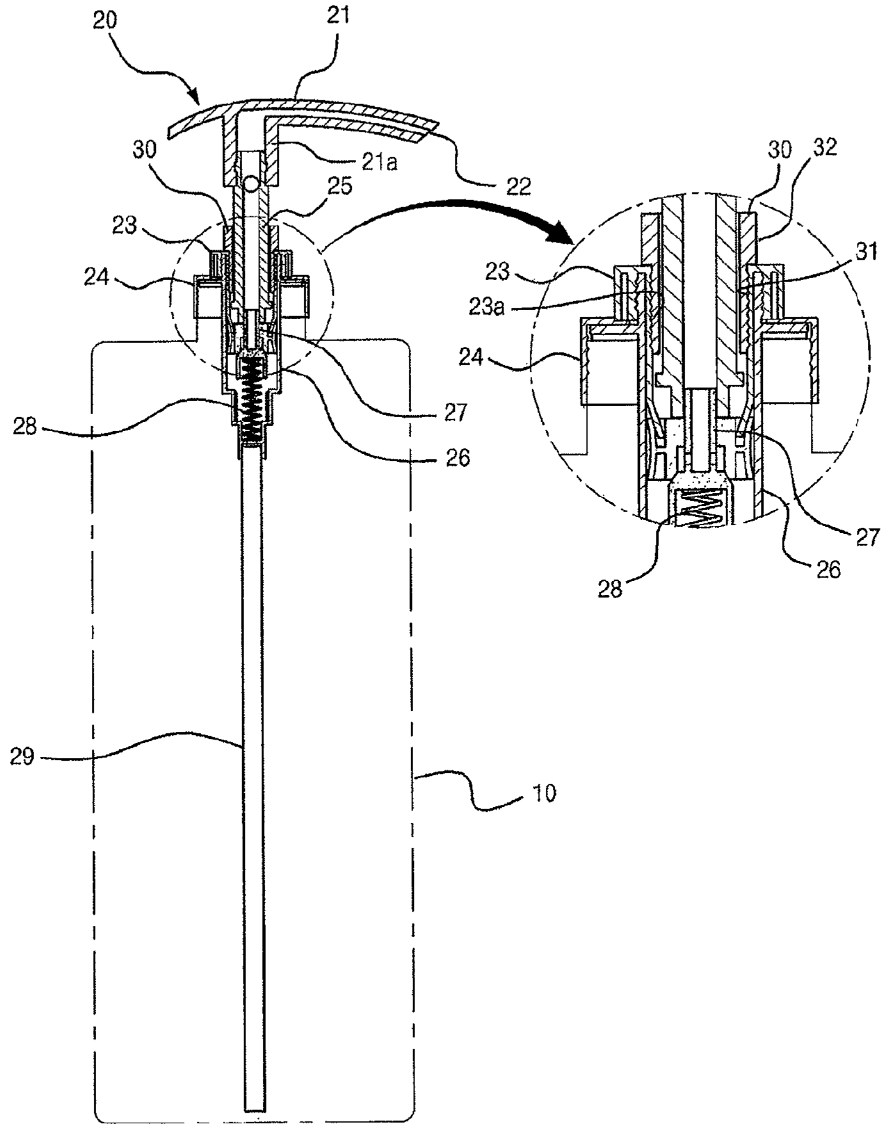
FIG. 3 is a cross sectional view illustrating a construction that a pumping part is installed at various containers according to the present invention.
Figure 4:
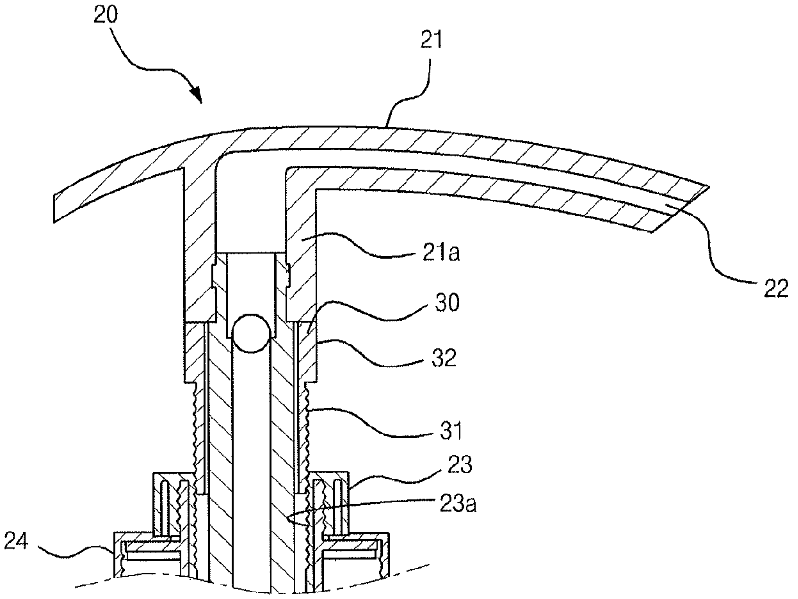
FIG. 4 is a view illustrating a state that a press button is not pressed with the aid of an adjusting member and a safety pin which are installed at a pumping part for various containers.
Figure 5:
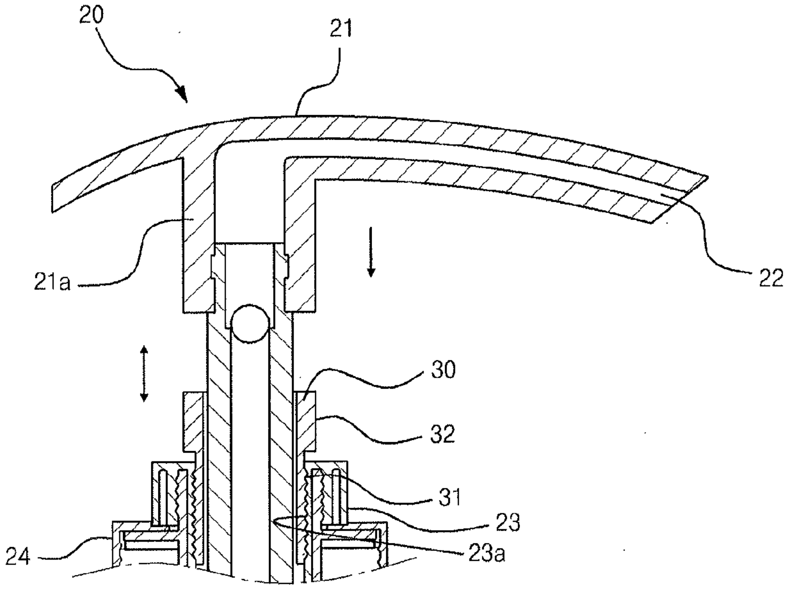
FIG. 5 is a view illustrating a state that contents are discharged as an adjusting member installed at a pumping part for various containers are adjusted upward or downward according to the present invention.
Figure 6:
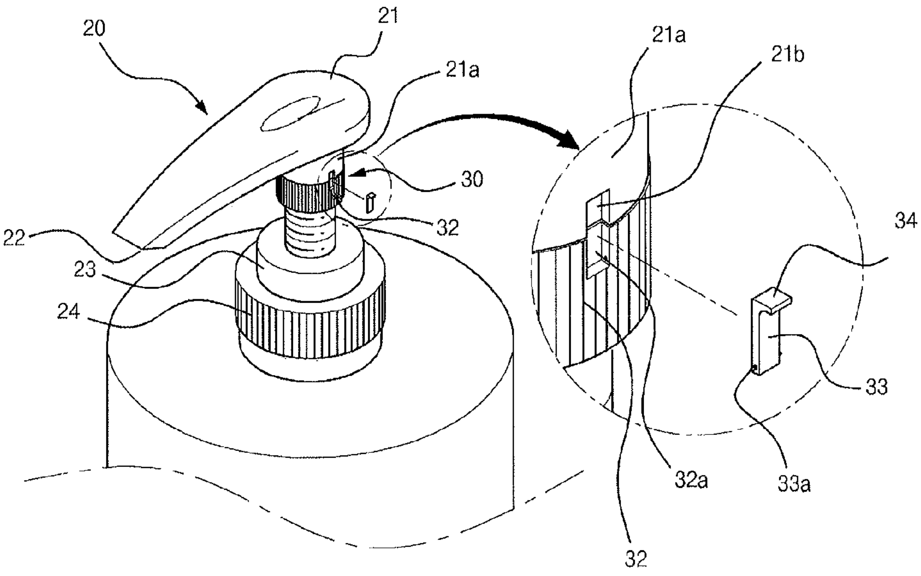
FIG. 6 is a view illustrating a construction of a safety pin installed at an adjusting member which is installed at a pumping part for various containers according to the present invention.

FIG. 2 is a perspective view illustrating a construction that a pumping part is installed at various containers according to the present invention. FIG. 3 is a cross sectional view illustrating a construction that a pumping part is installed at various containers according to the present invention. FIG. 4 is a view illustrating a state that a press button is not pressed with the aid of an adjusting member and a safety pin which are installed at a pumping part for various containers. FIG. 5 is a view illustrating a state that contents are discharged as an adjusting member installed at a pumping part for various containers are adjusted upward or downward according to the present invention. FIG. 6 is a view illustrating a construction of a safety pin installed at an adjusting member which is installed at a pumping part for various containers according to the present invention.

The present invention is basically directed to a pump safety device for various containers. In particular, the present invention is directed to a pump safety device for various containers which makes it possible to freely adjust a discharge amount of contents from a container and to securely fix a pump in such as way to install an adjusting member and a safety pin at a pump for various containers which are used to contain cosmetics, shampoo and kitchen rinses.

As best seen in FIGS. 2 to 6, the pump safety device for various containers according to the present invention has features in that a pumping part 20 which is configured to suck contents is engaged to the top of a container 10 containing contents.

The above mentioned pumping part 20 comprises a press button 21 and a discharge tube 22 which integrally projects from one side of the press button 21 and is configured to discharge contents to the outside, the press button 21 and the discharge tube 22 being disposed at the top, a support tubular member 25 which is engaged to the bottom of the press button 21, a piston 27 which is installed at the bottom of the support tubular member 25, a spring 28 which is installed at the bottom of the piston 27, a cylinder part 26 which accommodates the bottom of the support tube 25 and the piston 27, and a cap 23 and a lid 24 which are provided at the top of the cylinder part 26, of which the lid 24 is engaged to the top of the container 10 containing contents.

There are further provided a female screw part 23*a* installed at an inner side of the cap 23, and an adjusting member 30 which is engaged to the female screw part 23*a* of the cap 23 and is installed at the top of the cap 23 for thereby moving upward or downward.

Here, the adjusting member 30 comprises a male screw part 31 formed at an outer portion of the bottom and is engaged to the female screw part 23*a* of the cap 23, and a tooth-shaped adjusting part 32 which is formed at the top for the sake of manual rotations.

When not in use, the adjusting member 30 is disengaged from the cap 23 and is moved upward for the press button 21 not to be pressed, and when in use, the adjusting member 30 is freely tightened and moved downward for the press button 21 to be pressed, so the discharging amount of contents from the container 10 can be adjusted.

As best seen in FIG. 6, a safety pin groove 21*b* is formed at a connection portion 21*a* of the lower side of the press button 21. A pin groove 32*a* is formed at the top of the adjusting part 32 matching with the safety pin groove 21*b*. A safety pin 33 is engaged to both sides of the pin groove 32*a* using a hinge 33*a* and has a handle 34 at the top and is inserted into the safety pin groove 21*b*.

As best seen in FIG. 3, when the product needs to be protected from the unintended operations by kids or children, namely, when not in use, the adjusting part 32 of the adjusting member 30 engaged to the cap 23 is rotated by hands and is disengaged, and the male screw part 31 of the adjusting member 30 engaged to the female screw part 23*a* of the cap 23 is disengaged and moves upward and is positioned at the connection portion of the press button 21, so the press button 21 is not pressed with the aid of the adjusting member 30, the operations of which are shown in FIG. 4.

In the above described state, as best seen in FIG. 6, the safety pin 33 engaged to the hinge 33*a* at the pin groove 32*a* of the upper side of the adjusting part 32 of the adjusting member 30 is rotated upward using the handle 34, and the safety pin 33 is fixedly inserted into the safety pin groove 21*b*.

As a result of the above operations, the press button 21 is not pressed downward and is not even rotated since it is fixed.

In the above described operation states, even when a kid or a child presses the press button 21, it won't be pressed downward, so the contents are not discharged from the container 10 through the discharge tube 22, thus achieving safety in operations.

In a state shown in FIG. 4, when the user wants to use various containers, the safety pin 33 is disengaged, using the handle 34, from the safety pin groove 21*b* formed at a connection portion of the bottom of the press button 21 and is rotated downward, so the safety pin 33 is disengaged from the connection portion of the bottom of the press button 21.

When the user holds and rotates and tightens, with a hand, the adjusting part 32 of the adjusting member 30 engaged to the cap 23, the male screw part 31 of the adjusting member 30 is engaged to the female screw part 23*a* of the cap 23, and the adjusting member 30 moves downward and departs from the connection portion of the press button 21. In a state shown in FIG. 5, when the press button 21 is pressed, the contents contained in the container 10 are discharged through the discharge tube 22 with the aid of the piston 27 and the support tubular member 25.

In the above described state, when the adjusting member 30 is freely adjustable in an upward or downward direction, there occurs a difference in the pressing degrees of the press button 21, which makes it possible to adjust the discharge amount of the contents from the container 10.

The present invention has advantageous features in that the press button 21 which has been once open by means of the pumping part 20 of the container 10 can be locked without pressing the press button 21, and an accurate discharge amount of contents can be determined, and the adjusting member 30, which moves while rotating upward or downward, is installed at the bottom of the connection portion 21*a* of the press button 21, so it is possible to determine an accurate discharge amount of contents in the same principles and fashions for the pumps installed at various kinds of containers.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims.

Therefore all changes and modifications that fall within the meets and bounds of the claims, or equivalences of such meets and bounds are therefore intended to be embraced by the appended claims.

The invention claimed is:

1. A pump safety device for various containers, comprising:

a pump which is engaged to the top of a container containing contents and sucks contents, the pump being formed of a press button and a discharge tube which integrally projects from one side of the press button and discharge contents to the outside, which are provided at the top of the container, a cylinder part installed at an outer side of a support tubular member engaged to the bottom of the press button, and a cap and a lid which are installed at the top of the cylinder part, the lid being engaged to the top of the container containing contents;

a female screw part which is provided at an inner side of the cap; and an adjusting member which is engaged to the female screw part of the cap and is installed at the top of the cap and is capable of adjusting upward or downward, wherein the adjusting member comprises:

a male screw part which is formed at an outer side of the bottom of the adjusting member for an engagement with the female screw part of the cap; and a sawtooth-shaped adjusting part which is formed at the top of the adjusting member and is manually rotatable, and wherein a safety pin groove is formed at a connection portion of the bottom of the press button, and a pin groove is formed at the top of the adjusting part matching with the safety pin groove, and a safety pin is hinge-engaged to both sides of the pin groove and has a handle at the top for an insertion into the safety pin groove.

2. The pump safety device for various containers according to claim 1, wherein when not in use, the adjusting member is disengaged from the cap and is moved upward for the press button not to be pressed, and when in use, the adjusting member is freely tightened and is moved downward for the press button to be pressed, for thereby adjusting a discharge amount of the contents from the container.

3. A pump safety device for various containers, comprising:

a pump, the pump comprising a press button and a support tube extending downwardly from the press button;

a cap configured to attach to a top of a container;

screw threads provided at an inner side of the cap; and an adjusting member having a screw part provided with screw threads on an outer surface configured to engage the cap, and an adjustment part above the screw part, wherein the pump is movable in a vertical direction, wherein the support tube extends through the adjusting member, wherein a bottom surface of the press button contacts the adjusting part to limit movement of the pump in the vertical direction, wherein the adjusting member comprises:

a male screw part which is formed at an outer side of the bottom of the adjusting member for an engagement with the female screw part of the cap; and a sawtooth-shaped adjusting part which is formed at the top of the adjusting member and is manually rotatable, and wherein a safety pin groove is formed at a connection portion of the bottom of the press button, and a pin groove is formed at the top of the adjusting part matching with the safety pin groove, and a safety pin is hinge-engaged to both sides of the pin groove and has a handle at the top for an insertion into the safety pin groove.

4. The pump safety device of claim 3, wherein a diameter of the adjustment part is larger than a diameter of the screw part.

5. A pump safety device for various containers, comprising:

a pump, the pump comprising a press button and a support tube extending downwardly from the press button;

a cap configured to attach to a top of a container;

screw threads provided at an inner side of the cap; and an adjusting member having a screw part provided with screw threads on an outer surface configured to engage the cap, and a top surface above the screw threads, wherein the pump is movable in a vertical direction, wherein the support tube extends through the adjusting member, wherein a bottom surface of the press button contacts the top surface of the adjustment member to limit movement of the pump in the vertical direction, wherein the adjusting member comprises:

a male screw part which is formed at an outer side of the bottom of the adjusting member for an engagement with the female screw part of the cap; and a sawtooth-shaped adjusting part which is formed at the top of the adjusting member and is manually rotatable, and wherein a safety pin groove is formed at a connection portion of the bottom of the press button, and a pin groove is formed at the top of the adjusting part matching with the safety pin groove, and a safety pin is hinge-engaged to both sides of the pin groove and has a handle at the top for an insertion into the safety pin groove.

* * * * *